G. W., S. & J. H. KIMBLE.
WIND WHEEL.

No. 109,911.  Patented Dec. 6, 1870.

Witnesses
Edw. P. Mau
D. H. Kane

Inventors
Geo. W. Kimble
Samuel Kimble
John H. Kimble
Chipman Hosmer & Co.
Attorneys 2 Sheets—Sheet 2.
G. W., S. & J. H. KIMBLE.
WIND WHEEL.
No. 109,911. Patented Dec. 6, 1870.
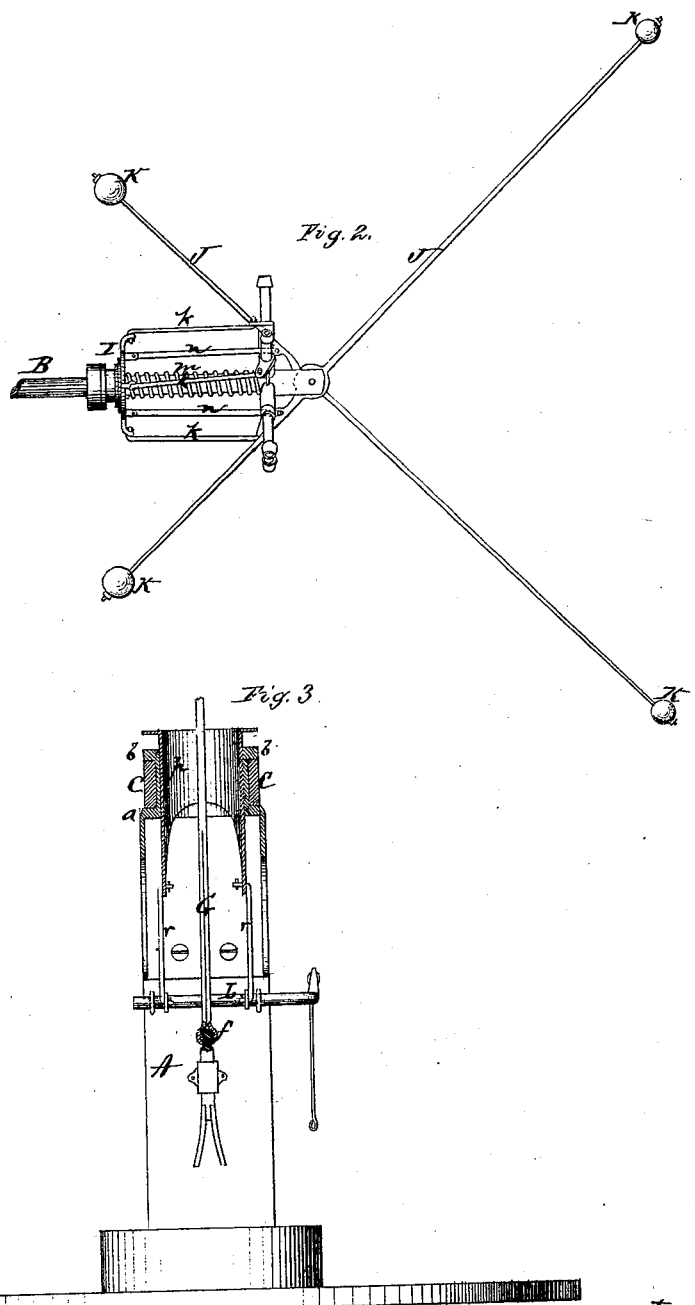

United States Patent Office.

JOHN H. KIMBLE, SAMUEL KIMBLE, AND GEORGE W. KIMBLE, OF FOX LAKE, WISCONSIN.

Letters Patent No. 109,911, dated December 6, 1870.

IMPROVEMENT IN WIND-WHEELS.

The Schedule referred to in these Letters Patent and making part of the same.

*To all whom it may concern:*

Be it known that we, JOHN H. KIMBLE, SAMUEL KIMBLE, and GEORGE W. KIMBLE, of Fox Lake, in the county of Dodge and State of Wisconsin, have invented a new and valuable Improvement in Windmills; and we do hereby declare that the following is a full, clear, and exact description of the construction and operation of the same, reference being had to the annexed drawing making a part of this specification, and to the letters and figures of reference marked thereon.

Figure 1 of the drawing is a representation of our windmill in perspective;

Figure 2 is an enlarged side view of the self-regulating mechanism; and

Figure 3 is an enlarged vertical section, showing the pitman and the mechanism for throwing the blades edgewise toward the wind.

Figure 1:
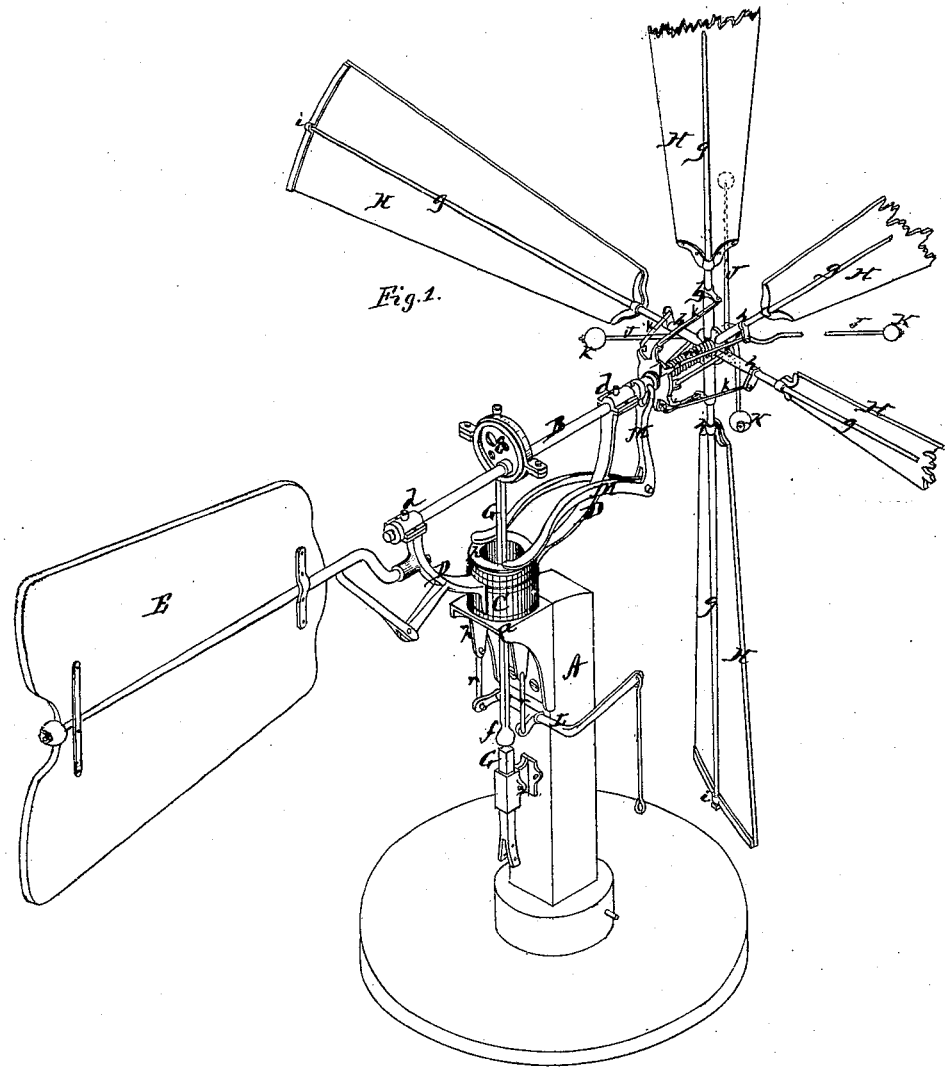

The nature of our invention consists in the construction and arrangement of a windmill, as will be hereinafter fully set forth.

In order to enable others skilled in the art to which our invention appertains to make and use the same, we will now proceed to describe its construction and operation.

A represents a standard or post, having, at its upper end, a projecting ledge or shelf, a, with a hole of suitable dimensions through it for the passage of the pitman that connects the windmill with the machinery to be operated.

On this ledge a is a small cylinder, b, provided with a flange around its upper end, as shown in fig. 3, and around said cylinder, between its flange and the ledge a, is placed a collar, C, provided with two arms, D D, which extend outward in opposite directions.

The arms D D, after having spread outward a suitable distance, are turned upward, and at their upper ends are placed boxes d d, in which the main shaft B is placed and revolves.

Upon a shaft extending from one of the arms D, and suitably supported by braces, is placed the windboard E.

The end of the shaft B in the opposite direction of the wind-board is extended a suitable distance, and upon the same are placed the blades as well as the self-regulating mechanism, as will be presently described.

Upon the main shaft B, directly above the center of the collar b, (or cylinder,) is placed an eccentric, e, surrounded by a metal strap at the upper end of the pitman G, which is provided with a socket-joint, f, so as to accommodate itself both to the motion of the eccentric and to the swinging around of the mill to the wind.

At the outer end of the main shaft B is a series of radiating arms g g, upon each of which is placed a wing or blade, H.

These blades are tapering, so as to be wider at their outer ends than at the inner ends, and at the inner ends they are each provided with a sleeve, h, through which the arm or rod g passes, the outer end of said arm being inserted in an eye, i, in the center of the outer edge of the blade, thus pivoting each blade lengthwise in the center on its arm.

Each of the collars or sleeves h is provided with a small arm which by a rod, k, is connected with an arm extending from a loose collar or sleeve, I, placed on the main shaft B, said collar I being pressed inward from the blades by means of a spiral spring, m, surrounding the shaft between said collar and the inner ends of the arms g.

The blades H, connecting-rods k, collar I, and spring m are so arranged that when the spring presses the collar the greatest distance from the blades, these are in the proper position to receive the wind; but, as the collar I is by any means moved outward toward the blades, they are gradually turned on their arms so as to present less and less surface to the action of the wind, until at last they are brought entirely edgewise against the wind, when, of course, the mill stops. Thus, by changing the position of the collar I, the velocity may be readily regulated, and this we propose to accomplish automatically by a governor operated by centrifugal force in the following manner:

The outer end of the shaft B immediately beyond the arms g g is flattened and slotted, as shown in fig. 2, and in this slot are pivoted two arms or rods J J, which cross each other, as shown, and are, at both ends, provided with balls K K, the outer end of each rod being, however, considerably longer than the inner.

The inner shorter ends of the arms J J are, by rods n n, connected with the collar or sleeve I.

It will readily be understood that when the mill is in operation the tendency of the balls will be from the center of rotation, and that, according to the velocity, they will be forced away from the same, so as to bring the arms or rods J J nearer to right angles with the main shaft B. But this motion of the arms draws the collar I closer outward to the blades, and, as above described, this movement of said collar turns the blades from the wind. Hence, when the velocity becomes too great, the governor causes the blades to turn edgewise, and when the velocity diminishes the blades are adjusted by the spiral spring m, which forces the collar I inward away from the blades again.

Within the cylinder b is another cylinder, p, provided at its upper end with a circumferential flange, which rests upon the flange of the cylinder b.

The lower end of the cylinder p is, by rods $r\ r_1$, connected with arms extending from a shaft, L, having a lever or crank at one end, so that by turning said shaft the cylinder $p$ may be raised.

Upon the outer end of a projection from one of the arms D is pivoted a bent lever, M, one end of which extends up and embraces the inner end of the collar I, while the other is forked and rests with one arm on each side of the pitman G, upon the flange of the cylinder $p$.

By raising this cylinder, as already mentioned, the lever M is turned so as to force the collar I outward and turn the blades completely edgewise, thus stopping the mill.

As soon as the crank of the shaft L is released the spring $m$ returns all the parts to their proper positions.

Having thus fully described our invention,

What we claim as new, and desire to secure by Letters Patent, is—

The combination of the collar I, lever M, cylinder $p$, rods $r\ r$, and shaft L, substantially as and for the purposes herein set forth.

In testimony that we claim the above, we have hereunto subscribed our names in the presence of two witnesses.

JOHN H. KIMBLE.
SAMUEL KIMBLE.
GEORGE W. KIMBLE.

Witnesses:
ARIE BANTA,
HENRY R. GILMORE.